May 18, 1965     A. J. HOVDE     3,184,023
COMPOUND FRICTION COUPLING

Filed Aug. 4, 1961     2 Sheets-Sheet 1

INVENTOR.
Arne J. Hovde
BY
E. E. James
ATTORNEY

INVENTOR.
Arne J. Hovde

United States Patent Office 3,184,023
Patented May 18, 1965

3,184,023
COMPOUND FRICTION COUPLING
Arne J. Hovde, Rocky River, Ohio, assignor to General Motors Corporation, Detroit, Mich., a corporation of Delaware
Filed Aug. 4, 1961, Ser. No. 129,428
5 Claims. (Cl. 192—87)

This invention relates generally to couplings; more particularly to friction clutches or brakes having a plurality of interleaved plates axially shiftable to effect frictional driving engagement therebetween; and, with regard to certain more specific aspects thereof, to a compound fluid pressure actuated clutch mechanism having particular application to marine propulsion drives.

In marine clutches of the type shown and described in in the United States Patent 2,925,156 to Arthur F. Grant and Robert R. King, the ahead and astern clutch units are selectively engageable to control the speed and direction of the propeller drive shaft. The clutch units must be able to accommodate limited angular and lateral axial misalignments between the prime mover and the reversing and speed reduction gear means. The clutch units must also be capable of accomplishing high speed drive reversals comparable to those possible with electrical drives. Such alternate clutch engagements counter-rotate the elements of the disengaged unit at twice the driving speed of the prime mover. To reduce the propulsion driving speed below that provided by the prime mover idle speed limit, the clutch units must be further capable of providing prolonged periods of controllable slip operation. Such operation tends to result in destructive impacting and chafing of the plate driving splined connections. Unless properly dissipated, the heat generated by such operation necessarily results in thermal growth and distortion of the clutch elements and in checking an uneven wear of the clutch plate surfaces. Under extreme conditions, destructive thermal lockup may occur between the several clutch elements.

The invention contemplates an improved clutch or brake mechanism of the type indicated having opposed actuating tubes for frictionally engaging the axial end surfaces of several plate elements under high speed reversing and control slip operating conditions and providing the several clutch plates with air flow inducing passages of opposite spiral to provide continuous cooling air flow over and between the frictionally engaged surfaces of the plate elements.

The foregoing and other objects, advantages and features of the invention will be apparent from the following description of a preferred illustrative embodiment thereof, having reference to the accompanying drawings in which.

Figure 1:
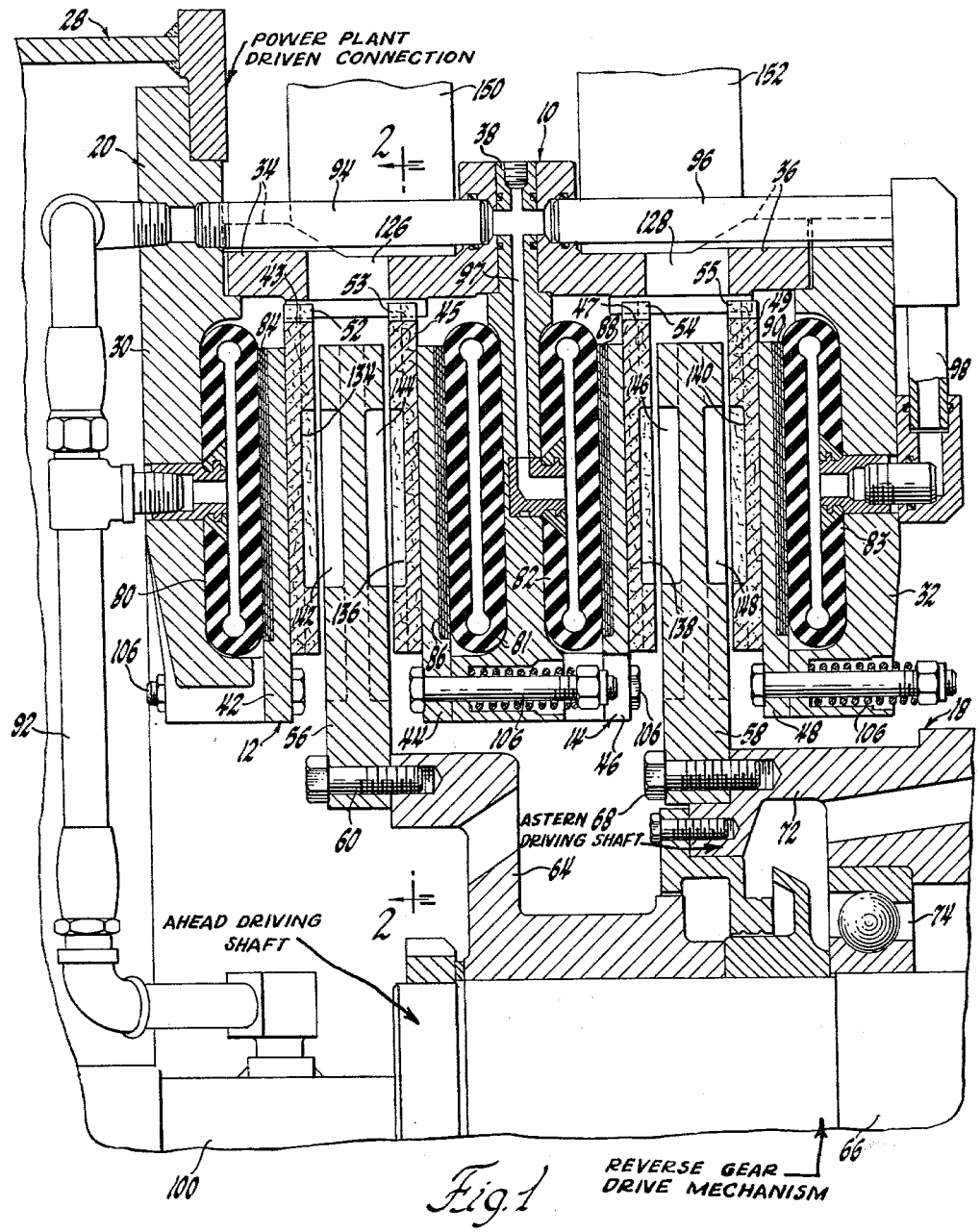
FIGURE 1 is a longitudinal sectional view of a compound marine clutch showing the details of a reverse drive coupling incorporating the invention.
Figure 2:
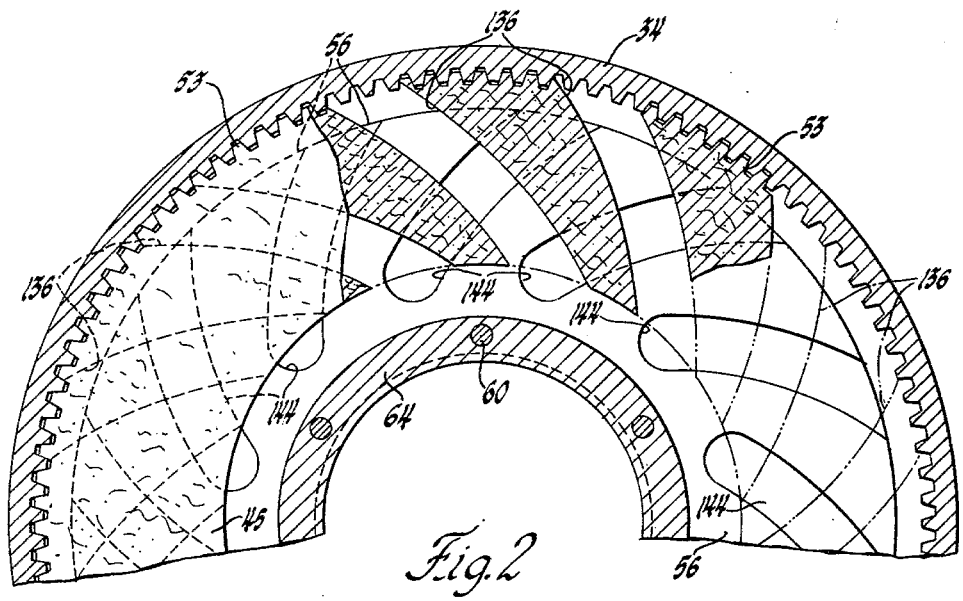
FIGURE 2 is a fragmentary transverse sectional view of the astern clutch unit taken substantially in the direction of the arrows and the plane of the line indicated at 2—2 of FIGURE 1, with portions thereof broken away and in further section.
Figure 3:
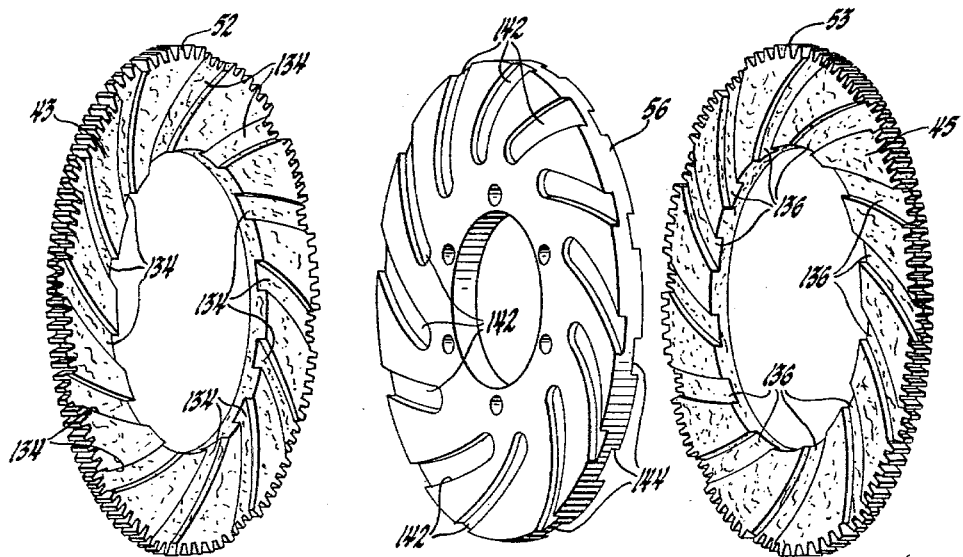
FIGURE 3 is an exploded assembly view showing details of the several driving and driven plates of one of the clutch units.

Referring more particularly to FIGURE 1, a marine reversing clutch is indicated generally by the reference numeral 10 and includes an ahead coupling 12 and an astern coupling 14. The two coupling units are selectively energizable to drivingly interconnect a unidirectional prime mover through a suitable reverse and reduction gear drive mechanism, partially shown at 18, to a propeller driving shaft, not shown, to provide either forward or reverse propulsion of the ship. The coupling units are independently and selectively engageable by fluid pressure supplied through the operation of a suitable associated control mechanism such as that shown and described in the aforementioned Patent 2,925,156. The coupling units are operable in a first range of operation to provide controllable slip of the propeller shaft output relative to the idling prime mover, the speed of the output shaft under such partially engaged conditions being substantially proportional to the actuating pressures applied thereto up to a given pressure at which either coupling is normally fully engaged at engine idle speed and load operating conditions. Further increases in the supplied actuating pressure above such a given pressure serves to increase the speed and torque capacity of the coupling unit to which it is applied.

The reverse clutch 10 includes a housing assembly 20 which serves as a common driving input member for both the forward and reverse coupling units. This housing is drivingly connected to the prime mover through an annular adapter partially indicated at 28. The drive housing comprises two annular longitudinally spaced end plates 30 and 32, two intermediate cylindrical members 34 and 36, and an intermediate plate member 38 suitably secured together as shown. The several housing members thus cooperate to define two annular recesses for mounting the ahead and astern coupling units.

The elements of the ahead and astern coupling units 12 and 14 are interchangeable and each includes two axially spaced annular driving plates 42, 44 and 46, 48, respectively. These plates each carry an annular shoe 43, 45, 47 and 49 of suitable non-metallic or cerametallic frictional material. The shoes 43, 45, 47 and 49 are externally splined at 52, 53 and 54, 55 to the intermediate housing members 34 and 36, respectively. The paired friction shoes or rings and driving plates of the ahead and astern coupling units are axially shiftable into frictional driving engagement with driven output clutch plates 56 and 58 sandwiched or interleaved therebetween. The driven clutch plate 56 is bolted inwardly at 60 to an ahead driving hub 64 secured on the adjacent end of a hollow shaft 66 which serves as an ahead input member for the reverse and reduction gear 18. The clutch plate 58 is similarly bolted at 68 to the adjacent end of a hollow shaft member 72 which is journaled on the ahead input drive shaft 66 by spaced anti-friction bearings, one being shown at 74. The shaft 72 serves as an astern input member for the gear unit 18.

Frictional driving engagement is effected between the several driving shoes and the ahead and astern output driving plates 56 and 58 by the selective inflation of two pairs of annular tubes 80, 81 and 82, 83, respectively. The two tubes 80 and 83 are carried by the drive housing end plates 30 and 32, respectively, and the tubes 81 and 82 are carried on opposite sides of the intermediate housing plate 38. When inflated, the opposing paired clutch actuating tubes serve to accommodate angular and lateral axial misalignments between prime mover driven clutch housing and the ahead and astern driven shafts of the gear unit. The alternate axial expansion of the paired tubes is transmitted to the several adjacent clutch driving plates through annular heat insulating plates 84, 86, 88 and 90. Fluid actuating pressure is supplied to and discharged from the ahead and astern clutch actuating tubes 80, 81 and 82, 83 by way of external and internal connections which are indicated at 92, 94, 96, 97 and 98 and extend radially and longitudinally of the housing 20 between the several tubes and supply passages extending longitudinally through an air supply tube or shaft 100. This air supply shaft is journaled in and projects beyond the hollow ahead driving shaft 66 of the gear mechanism and is drivingly connected for rotation with the drive housing. The distal end of the air supply shaft extends through the gear unit and is connected to suitable inflation supply control means, not shown.

To insure disengagement of the several clutch plates upon deflation of either the ahead or astern actuating tubes, a plurality of radially and equiangularly spaced spring biased bolts 106 extend longitudinally through the housing plates 30, 32 and 38. The several bolts 106 engage the inner peripheries of the several plates 42, 44, 46 and 48 and bias these plates toward abutment with the housing plates against the inflation biasing action of the several actuating tubes. The spring biased bolts 106 thus serve to positively disengage the several shoe mounting plates from the driven plates 56 and 58 upon deflation of the actuating tubes 80, 81 and 82, 83.

The clutch housing is open at each end and the hub 64 has a plurality of ports equiangularly spaced and extending therethrough as shown in FIGURE 1. This opening of the clutch interior permits fan passages defined between and carried by the several clutch elements to induce adequate cooling air flow through the coupling units for dissipation for the heat generated under all operating conditions including controlled slippage and high speed reversals.

The several air flow inducing fan passages include a plurality of radial ports 126 and 128 extending circumferentially through the cylindrical housing members 34 and 36. A plurality of logarithmic spiral grooves 134, 136, 138 and 140 are formed in the several shoe rings 43, 45, 47 and 48 and open to their surfaces engageable with the adjacent driven plate 56 or 58. The plates 56 and 58 are provided with similar logarithmic spiral grooves 142, 144 and 146, 148, respectively, opening to the shoe engaging end surfaces thereof. The adjacent logarithmic grooves of the driving shoes and driven plates are of opposite hand so that the several grooves and the surfaces therebetween intersect at substantially right angles to each other when these elements are frictionally engaged. Being continuously driven by the engine prime mover, the radial ports 126 and 128 and the several shoe defined fan passages induce a limited, but continuous quantity of cooling air flow through their respective clutch units. Upon engagement with the driven plate 56 or 58, this shoe induced air flow is augmented by that provided through the several groove defined fan passages of the driven plate. The opposite spiral grooves of the driving and driven clutch elements thus cooperate to provide a two-step fan action for inducing cooling air flow over and between the frictionally engageable surfaces of these elements. The air flow inducing action of the spiral grooves and of the radial housing ports is augmented in the illustrative embodiment by two auxiliary fan impeller rings 150 and 152. These fan rings are fabricated from suitable sheet metal stampings and mounted circumferentially of the housing members 34 and 36 outwardly of the ports 126 and 128.

While the foregoing description has been limited to a single preferred illustrative embodiment of the invention, various modifications and changes might be made therein without departing from the spirit and scope of the invention as defined by the following claims.

I claim:
1. A torque transmitting mechanism capable of accommodating limited misalignment and of providing prolonged periods of variable slip operation between a continuously driven input member and a load driving output shaft, said mechanism comprising an input driven cylindrical housing having a plurality of air circulating ports extending therethrough, said output shaft extending within and spacedly embraced by said housing in substantially coaxial relation and rotatably mounted to permit limited angular and lateral misalignment therebetween, a driven output plate fixedly secured to said output shaft within said housing, a pair of backing plates in spaced flanking relation to the driven plate, an annular driving plate of frictional material secured to each of said backing plates and frictionally engageable with said driven plate, said driving plates being slidably splined internally of the housing, inflatable actuating means interposed between said housing and each of said backing plates and selectively inflatable to regulate and deflatable to release frictional driving engagement between said driving and driven plates, said inflatable actuating means and driving plates cooperating to accommodate the limited angular and lateral misalignments permitted between the rotative axes of said input driven housing and output shaft and to damp resultant torsional load variations acting therebetween, and said driven output plate and said driving plate each having a plurality of spiral grooves opening on the frictionally engageable opposing surfaces thereof, the grooves of adjacent plates defining intersecting fan passages, and said passages cooperating with said ports upon rotation of said plates and housing to induce cooling air flow over and outwardly therethrough over and between said frictionally engageable surfaces.

2. A compound clutch mechanism capable of effecting high speed load changes and accommodating prolonged periods of variable slip operation between a driving input and a driven load, said mechanism comprising an input housing drum drivingly connectable to a prime mover, said housing drum defining two inwardly facing annular chambers and having a plurality of air circulating ports extending outwardly therethrough, a first output driving shaft rotatably mounted to permit limited angular and lateral misalignment with said housing drum, a second output driving shaft journaled on said first output shaft, first and second output shafts each being drivingly connectable to a driven load, a first driven output plate extending within said one annular chamber and fixedly secured to the first output shaft, a second driven output plate extending within said other annular chamber and fixedly secured to said second output shaft, a pair of driving plates of substantially non-metallic frictional material mounted within each of said annular chambers in parallel flanking relation to the output plate therein, said paired driving plates being slidably and drivingly splined internally of the housing drum for axial movement into frictional driving engagement with the driven output plates, opposed fluid pressure actuating means interposed between said drum and said driving plates within each of said annular chambers, the opposed actuating means within each chamber being selectively and simultaneously energizable to effect proportional frictional driving engagement between said driving and driven plates and cooperating therewith to accommodate the permitted misalignment between said housing drum and output shafts and resultant torsional load variations acting between said driving and driven plates, and said driving and driven plates each having equiangularly spaced spiral grooves opening on their respective frictional engageable surfaces, the spiral grooves of adjacent plates being of opposite hand and defining intersecting fan passages cooperating with said ports upon rotation of said plates and drum to induce cooling air flow over and between the frictionally engageable surfaces.

3. A multi-plate compound marine clutch mechanism capable of effecting high speed load changes and accommodating limited misalignment between a driven input member and a load driving output shaft and prolonged periods of variable slip frictional driving engagement proportional to actuating pressures applied thereto, said mechanism comprising an input housing drum drivingly connectable to a prime mover, said housing defining two inwardly facing annular chambers and having a plurality of air circulating ports extending outwardly therethrough, an output shaft rotatably mounted to permit limited angular and lateral misalignment with said housing drum, a first hub secured to said output shaft and spacedly embraced by one of said housing chambers, a second hub journaled on said output shaft and spacedly embraced by the other of said housing chambers, said output shaft and second hub each being drivingly connectable to a driven output load, a first driven output plate extending within said one annular chamber and rigidly secured to said first hub, a second driven output plate extending within said other annular chamber and rigidly secured to said second hub, a pair of backing plates mounted within each of said annular chambers in spaced parallel flanking relation to the output plate therein, an annular driving plate of substantially non-metallic frictional material secured to each of said backing rings, said driving plates being slidably and drivingly splined internally of the housing drum for axial movement into frictional driving engagement with the driven output plates, a pair of expansible actuating tubes of resilient material mounted within each of said annular chambers between each of said backing plates and the adjacent end and intermediate wall portions of the drum, said paired actuating tubes being alternately inflatable to effect selective and proportional frictional driving engagement between said driving and driven plates and cooperating therewith to accommodate the permitted misalignment between said housing drum and said output shaft mounted hubs and acting to damp the resultant torsional load variations acting between said driving and driven plates, and each of said driving and driven plates having spiral grooves opening equiangularly of their respective frictional engageable surfaces, the grooves of adjacent plates being oppositely disposed and defining intersecting fan passages cooperating with said ports upon rotation of said driving and driven members to induce cooling air flow over and between said frictionally engageable surfaces.

4. A torque transmitting mechanism capable of accommodating limited misalignment and of providing prolonged periods of variable slip operation between a continuously driven input member and a load driving output shaft, said mechanism comprising an input driven cylindrical housing having a plurality of air circulating ports extending therethrough, said output shaft extending within and spacedly embraced by said housing in substantially coaxial relation and rotatably mounted to permit limited angular and lateral misalignment therebetween, a driven output plate fixedly secured to said output shaft within said housing, a pair of backing plates in spaced flanking relation to the driven plate, an annular driving plate of frictional material secured to each of said backing plates and frictionally engageable with said driven plate, said driving plates being slidably splined internally of the housing, inflatable actuating means interposed between said housing and each of said backing plates and selectively inflatable to regulate and deflatable to release frictional driving engagement between said driving and driven plates, said inflatable actuating means and driving plates cooperating to accommodate the limited angular and lateral misalignments permitted between the rotative axes of said input driven housing and output shaft and to damp resultant torsional load variations acting therebetween, and said driving plates each having a plurality of angularly spaced grooves opening on the frictionally engageable surfaces thereof and defining fan passages, and said passages cooperating with said housing ports upon rotation of said driving plates and housing to induce cooling air flow outwardly therethrough passing over and between said frictionally engageable surfaces of said plates.

5. A compound clutch mechanism capable of effecting high speed load changes and accommodating prolonged periods of variable slip operation between a driving input and a driven load, said mechanism comprising an input housing drum drivingly connectable to a prime mover, said housing drum defining two inwardly facing annular chambers and having a plurality of air circulating ports extending outwardly therethrough, a first output driving shaft rotatably mounted to permit limited angular and lateral misalignment with said housing drum, a second output driving shaft journaled on said first output shaft, first and second output shafts each being drivingly connectable to a driven load, a first driven output plate extending within said one annular chamber and fixedly secured to the first output shaft, a second driven output plate extending within said other annular chamber and fixedly secured to said second output shaft, a pair of driving plates of substantially non-metallic frictional material mounted within each of said annular chambers in parallel flanking relation to the output plate therein, said paired driving plates being slidably and drivingly splined internally of the housing drum for axial movement into frictional driving engagement with the driven output plates, opposed fluid pressure actuating means interposed between said drum and said driving plates within each of said annular chambers, the opposed actuating means within each chamber being selectively and simultaneously energizable to effect proportional frictional driving engagement between said driving and driven plates and cooperating therewith to accommodate the permitted misalignment between said housing drum and output shafts and resultant torsional load variations acting between said driving and driven plates, and said driving plates each having equiangularly spaced grooves opening on their respective frictional engageable surfaces and defining fan passages cooperating with said housing ports upon rotation of said driving plates and housing drum to induce cooling air flow over and between the frictionally engageable surfaces of said plates.

References Cited by the Examiner

UNITED STATES PATENTS 2,743,792    5/56    Ransom _____ 192—113.2 X
3,002,597   10/61    Warman et al. _____ 192—87

DON A. WAITE, *Primary Examiner.*